United States Patent [19]

Lafler

[11] Patent Number: 4,847,548
[45] Date of Patent: Jul. 11, 1989

[54] SIGNAL CONDITIONER FOR A LINEAR VARIABLE DIFFERENTIAL TRANSFORMER

[75] Inventor: Lawrence R. Lafler, St. Cloud, Minn.

[73] Assignee: General Signal Corporation, Stamford, Conn.

[21] Appl. No.: 149,674

[22] Filed: Jan. 28, 1988

[51] Int. Cl.$^4$ .............................................. G05F 1/14
[52] U.S. Cl. .................................. 323/264; 323/347; 324/208; 318/657; 340/870.36
[58] Field of Search .............. 323/215, 216, 264, 347, 323/355; 318/652, 653, 654, 655, 656, 657; 324/207, 208; 340/870.36

[56] References Cited

U.S. PATENT DOCUMENTS

| | | | |
|---|---|---|---|
| 2,827,787 | 3/1958 | Kroeger | 73/735 |
| 3,079,545 | 2/1963 | Kretsch et al. | 323/264 |
| 3,105,189 | 9/1963 | Forster | 323/215 |
| 3,235,790 | 2/1966 | Collins | 324/208 X |
| 3,440,520 | 4/1969 | Jones et al. | 323/264 X |
| 3,892,043 | 7/1975 | Bonikowski | 33/143 L |
| 4,140,998 | 2/1979 | Bettle | 318/657 X |
| 4,282,485 | 8/1981 | Pauwels et al. | 323/347 X |
| 4,514,689 | 4/1985 | Gerard | 324/280 |
| 4,678,991 | 7/1987 | Schmidt | 324/208 X |

FOREIGN PATENT DOCUMENTS

| | | | |
|---|---|---|---|
| 2563335 | 10/1985 | France | 324/208 |
| 0697800 | 11/1979 | U.S.S.R. | 324/208 |

Primary Examiner—Patrick R. Salce
Assistant Examiner—Kristine Peckman
Attorney, Agent, or Firm—Barnes & Thornburg

[57] ABSTRACT

A signal conditioner for a linear variable differential transformer having a first amplifier which senses the differences in amplitude between secondary alternating current voltages in the two secondaries respectively, and a second amplifier which compares the phase of the difference signal from the first amplifier with the phase of one of the secondary alternating voltages. A conditioned signal $A_{out}$ is output by the signal conditioner according to the equation $A_{out} = K_1 V_{s1} + K_2 (V_{s1} - V_{s2})$ where $K_1$ and $K_2$ are constants, and $V_{s1}$ and $V_{s2}$ are instantaneous voltages across the respective secondaries.

6 Claims, 1 Drawing Sheet

SIGNAL CONDITIONER FOR A LINEAR VARIABLE DIFFERENTIAL TRANSFORMER

BACKGROUND AND SUMMARY OF THE INVENTION

The present invention relates to a signal conditioner for a linear variable differential transformer with a center-tapped secondary or two or more secondaries and a relatively moveable core.

A linear variable differential transformer (LVDT) is an electro-mechanical transducer which allows for the measurement of very small motions in a structural mechanical device. LVDTs are used for measuring position, pressure, load weight, angular position, and acceleration. In an LVDT, mechanical motion of a core is translated to an electrical signal which contains position information in the phase and amplitude of an output AC waveform.

In order to obtain useful information from the LVDT, a signal conditioner is required. There are three basic operations which are performed by an LVDT signal conditioner. First, the conditioner must drive the primary winding of the LVDT with an AC signal. Second, the conditioner obtains position information from the LVDT by detecting the difference between the voltages developed across the two secondary windings. This difference is an AC signal which has a phase relative to the drive signal that indicates the LVDT core is above or below the center position. The amplitude of this AC signal indicates the distance of the LVDT core from the center position. Finally, the difference is then converted into a useful electrical signal that is proportional to the position of the moveable core within the LVDT.

At some point in the signal conditioning process, the AC signals obtained from the secondaries must be rectified and filtered to generate an output DC signal. In U.S. Pat. No. 3,079,545 to Kretsch et al., the signals from the secondaries are rectified first, and an output signal is found from the difference between these rectified signals obtained by subtracting one DC voltage from the other. However, such a design results in lower accuracy than more modern devices, since there are always differences in the DC voltage generated by seemingly identical rectifiers from a given AC voltage of a given amplitude. This would have the effect of reducing the accuracy of measurements that are based in the difference between two DC voltages when these voltages are derived from AC voltages of nearly equal amplitude. By directly sensing the difference between the secondary AC voltages, and only then employing a single rectifier to generate the necessary DC voltage, more modern devices eliminate this source of error.

In the more recent state of LVDT signal conditioner technology, the conditioner senses the difference in amplitude between the two secondary AC voltages. This difference is then rectified. To preserve the phase information contained in the AC voltage, the AC signal is rectified with the aid of a synchronous demodulator. Such an LVDT signal conditioner is shown in Signetics product NE/SE 5520 and FIG. 3. However, the use of a synchronous demodulator increases the circuit complexity and the power requirements.

Accordingly, it is an object of the present invention to provide an LVDT signal conditioner which has reduced circuit complexity and power requirements, while retaining a high accuracy of measurement.

Another object of the present invention is to provide a signal conditioner which uses a summing amplifier in such a way that it serves the dual purpose of preserving the phase information in the difference between two secondary AC voltages, while shifting the level of the DC output signal.

These and other objects are achieved in the present invention which provides a signal conditioner for a linear variable differential transformer having a difference circuit for sensing differences in amplitude between secondary alternating current voltages in the first and second secondaries and a phase comparator for comparing the phase of a difference signal from the differential amplifier with the phase of one of the secondary alternating current voltages to produce a position signal. A peak detector is connected to the output of the phase comparator.

In certain preferred embodiments, the difference circuit includes a first differential amplifier for forming a difference between the first and second secondary voltages multiplied by a first constant, and a second differential amplifier for adding the first secondary voltage multiplied by a second constant to the difference from the first differential amplifier. The addition of the first secondary voltage multiplied by the second constant shifts the level of the DC output voltage position signal so that the position signals are always the same polarity.

Other objects, features and advantages of the present invention will become more apparent from the following description when taken with the accompanying drawings which show, for purposes of illustration only, an embodiment in accordance with the present invention.

DETAILED DESCRIPTION OF THE DRAWINGS

Figure 1:
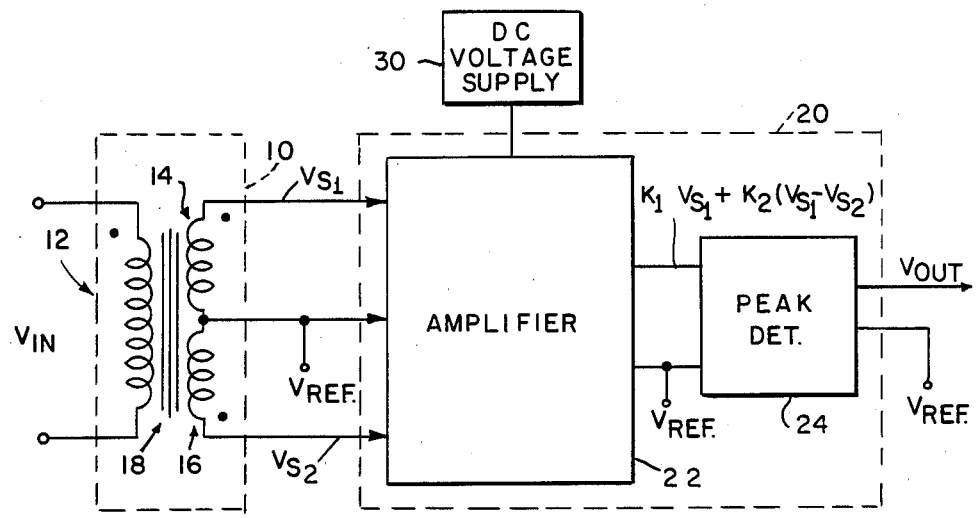
FIG. 1 is a block diagram showing an LVDT signal conditioner constructed in accordance with a preferred embodiment of the present invention.

As seen in FIG. 1, the LVDT 10 includes a primary 12, a first secondary 14, a second secondary 16 and a moveable core 18 between the primary 12 and first and second secondaries 14, 16. Connected to the secondaries 14, 16 of LVDT 10 is a signal conditioner 20, which essentially comprises amplifier 22 and peak detector 24. A DC voltage supply 30 is provided.

The amplifier 22 has as its inputs $V_{s1}$ which is the voltage across the first secondary 14, and $V_{s2}$ which is the voltage across the second secondary 16. The voltages $V_{s1}$ and $V_{s2}$ are instantaneous values of the AC voltages measured with respect to ground. $V_{s1}$ is in phase with $V_{s2}$.

The amplifier 22 receives the two signals $V_{s1}$ and $V_{s2}$ and produces an amplifier output signal $A_{out}$ according to the equation $A_{out} = K_1 V_{s1} + K_2(V_{s1} - V_{s2})$. In this equation, $K_1$ and $K_2$ are constants. The amplifier output $A_{out}$, an AC signal, is received by the peak detector 24. A DC output voltage $V_{out}$, which is equal to the peak value of $A_{out}$, is outputted by the peak detector 24.

When the LVDT core 18 is centered, $V_{s1}$ will equal $V_{s2}$ so that $V_{out}$ will equal the peak of $K_1 V_{s1}$. As the core 18 moves up in FIG. 1, $V_{s1}$ will increase and $V_{s2}$ will decrease. According to the equation, $A_{out}$ will increase as will $V_{out}$. In contrast, as the core 18 moves downward (towards the second secondary 16), $V_{s1}$ will decrease while $V_{s2}$ increases. This will decrease the amplifier output $A_{out}$ as well as the voltage output $V_{out}$.

In the preferred embodiments, the constant $K_1$ is chosen so that the nominal value of $K_1 V_{s1}$ produces a $V_{out}$ that is midway between the minimum and maximum allowable values for $V_{out}$. The constant $K_2$ is chosen to provide the desired sensitivity of $V_{out}$ to changes in core position. $K_2$ can be assigned any value within the range where the magnitude of $K_2(V_{s1}-V_{s2})$ is always less than the magnitude of $K_1 V_{s1}$. In most cases, the difference between the $V_{s1}$ and $V_{s2}$ remains small compared to $V_{s1}$, so the magnitude of $K_2$ can be much larger than the magnitude of $K_1$. Typical values for these constants would be $K_1=2$ and $K_2=25$.

The phase information of the AC difference signal relating to the core position is preserved by the amplifier 22 in the relationship between the phase of the difference signal $(V_{s1}-V_{s2})$ relative to the phase of $V_{s1}$. When the core 18 is on one side of its center position, the difference signal $(V_{s1}-V_{s2})$ is in phase with or added to $V_{s1}$. However, when the core 18 is on the opposite side of its center position, the difference signal $(V_{s1}-V_{s2})$ is 180° out of phase with or subtracted from $V_{s1}$.

Figure 2:
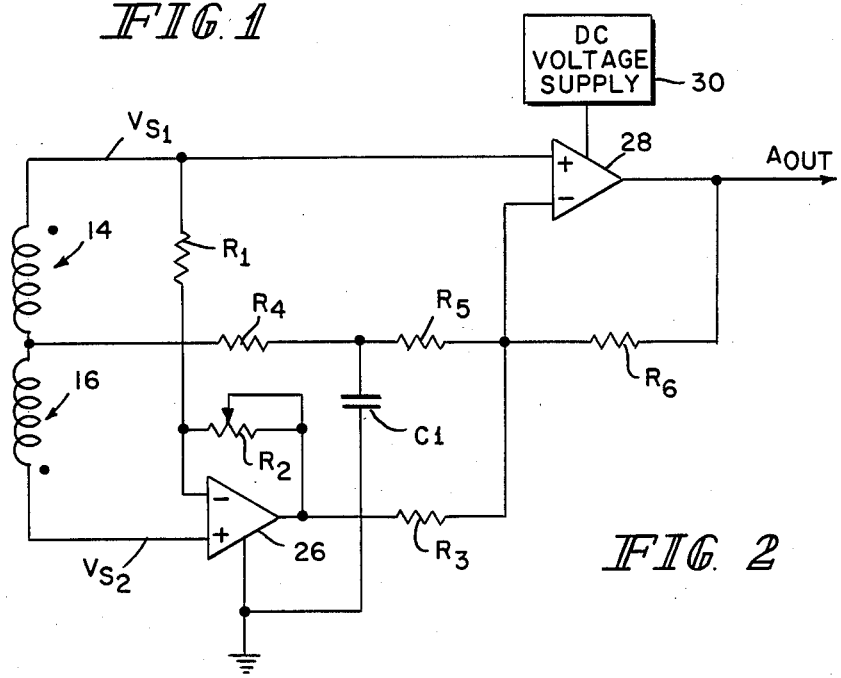
FIG. 2 is a schematic diagram of a portion of the embodiment of FIG. 1.
Figure 3:
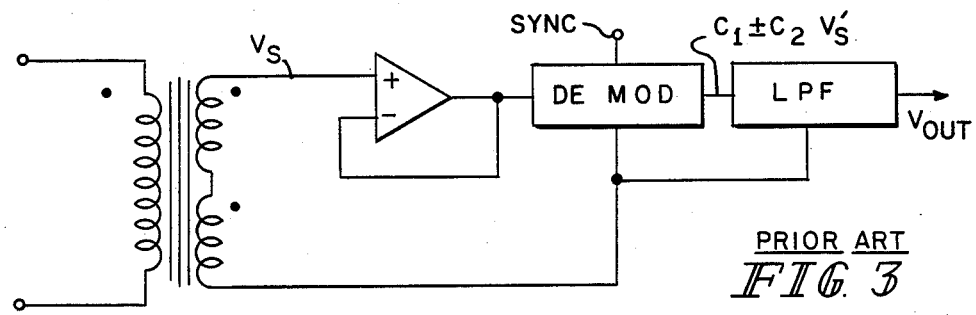
FIG. 3 is a block diagram of a prior art device.

FIG. 2 shows the amplifier 22 of signal conditioner of FIG. 1 in a schematic diagram, in which like elements are referred to by like reference numerals. The amplifier 22 includes two differential amplifiers 26 and 28. The first differential amplifier 26 has its two inputs connected across both transformers 14, 16 and its output is the difference signal proportional to $(V_{s2}-V_{s1})$. The second differential amplifier 28 has its positive input connected to the first secondary 14, so that it receives a $V_{s1}$ signal, while its negative input is connected to the output of the first differential amplifier 26 so that it receives the difference proportional to $(V_{s2}-V_{s1})$. The amplifier 28 subtracts the difference signal from $V_{s1}$ and produces the amplifier output $A_{out}$ which is equal to $K_1 V_{s1}+K_2(V_{s1}-V_{s2})$.

The resistors $R_1$, $R_2$, $R_3$ and $R_6$ determine the value of $K_2$, wherein $K_2=(1+R_2/R_1)(R_6/R_3)$. Resistors $R_4$, $R_5$ and $R_6$ determine the value of $K_1$, wherein $K_1=R_6/(R_4+R_5)$. Capacitor C, shifts the phase of $V_{s1}$ to match the phase shift of $(V_{s1}-V_{s2})$ which occurs in amplifier 26.

The amplified output signal $A_{out}$ is received by the peak detector 24. The peak detector 24 detects the peak value of $A_{out}$ and outputs a DC voltage $V_{out}$ which is equal to the peak value of the amplifier output $A_{out}$. The peak detector 24 is conventional and is therefore not shown in greater detail. Similarly, the voltage supply 30 for supplying a temperature compensated DC voltage to the signal conditioner 20 is also conventional and not shown in greater detail.

Thus it can be seen that the objects of the invention have been achieved in that a highly accurate, non-complex LVDT signal conditioner has been provided. Although the present invention has been described and illustrated in detail, it is to be clearly understood that the same is by way of illustration and example only and is not to be taken by way of limitation. The spirit and scope of the invention are to be limited only by the terms of the appended claims.

What is claimed:

1. A signal conditioner in a linear variable differential transformer circuit having a primary, and first and second secondaries and a moveable core, said signal conditioner comprising:
   first differential amplifier means for forming a difference signal between secondary voltages of said first and second secondary multiplied by a first constant; and
   second differential amplifier means for adding said secondary voltage of said first secondary multiplied by a second constant to said difference signal from said first differential amplifier means to produce a position signal.

2. The signal conditioner of claim 1 wherein said first secondary voltage multiplied by said second constant shifts a DC voltage level of said position signal such that said position signal is always the same polarity.

3. The signal conditioner of claim 2, wherein said first differential amplifier means is a differential amplifier having at least two inputs and one output with said inputs being connected across series connected first and second secondaries.

4. The signal conditioner of claim 3, wherein said second differential amplifier means is a differential amplifier having at least two inputs and one output with one of said inputs being connected to said first secondary and the other of said inputs being connected to said first differential amplifier output.

5. The signal conditioner of claim 2, including a peak detector for converting said difference signal to a DC voltage level.

6. A signal conditioner for a linear variable differential transformer having a primary, first and second secondaries, and a movable core, comprising:
   sensing means for sensing instantaneous voltages appearing across first and second secondaries of a linear variable differential transformer; and
   conditioning means for receiving said sensed voltages and outputting a position signal according to the equation $A_{out}=K_1 V_{s1}+K_2(V_{s1}-V_{s2})$, where $A_{out}$ is the position signal, $K_1$ and $K_2$ are constants, $V_{s1}$ and $V_{s2}$ are said instantaneous voltages appearing across said first and second secondaries respectively, and $K_1$ is selected to shift the position signal sufficient to cause said position signal to always be at the same polarity.

* * * * *